United States Patent

[11] 3,618,760

| [72] | Inventor | Douglas H. Strong<br>Mentor, Ohio |
|---|---|---|
| [21] | Appl. No. | 765,626 |
| [22] | Filed | Oct. 7, 1968 |
| [45] | Patented | Nov. 9, 1971 |
| [73] | Assignee | Diamond Shamrock Corporation<br>Cleveland, Ohio |

[54] STORAGE STABLE ONE-PART POLYMERCAPTAN COMPOSITIONS
3 Claims, No Drawings

[52] U.S. Cl. .................................................... 206/84,
260/18 R, 260/23 AR, 260/31.8 Z, 260/37 R,
260/79, 260/79.7
[51] Int. Cl. ............................................ C08g 43/00,
B65d 81/00
[50] Field of Search ................................... 260/18,
79.1, 23 AR, 79.7, 79; 206/84

[56] References Cited
UNITED STATES PATENTS

| 3,413,261 | 11/1968 | Schalin | 260/45.9 |
|---|---|---|---|
| 3,402,151 | 9/1968 | Kutch | 260/79.1 |
| 3,349,047 | 10/1967 | Sheard | 260/79.1 |
| 3,278,496 | 10/1966 | Le Fave et al. | 260/79.1 |
| 3,258,495 | 6/1966 | Le Fave et al. | 260/18 |
| 3,247,138 | 4/1966 | Jorczak et al. | 260/79.1 |
| 3,225,017 | 12/1965 | Seegman et al. | 260/79.1 |
| 2,929,794 | 3/1960 | Simon | 260/79.1 |
| 2,466,963 | 4/1949 | Patrick et al. | 260/79.1 |
| 3,518,211 | 6/1970 | Downs et al. | 260/18 |

OTHER REFERENCES

" Polysulfide Polymers" ; Fettes et al.; Industrial and Engineering Chemistry; Vol. 42; November 1950; pages 2217–2220

" Polysulfide Liquid Polymers" ; Jorczak et al.; Industrial and Engineering Chemistry; Vol. 43; February 1951; pages 324– 327.

*Primary Examiner*—Donald E. Czaja
*Assistant Examiner*—C. Warren Ivy
*Attorneys*—C. Thomas Cross, Roy Davis, Timothy E. Tinkler, Dick M. Warburton, John J. Freer, Sam E. Laub, Neal T. Levin, Leslie G. Nunn, Jr. and Helen P. Brush

ABSTRACT: This invention presents metallic soaps which are useful for promoting tack-free surfaces and for curing polymercaptan sealants with quick formation of a protective skin on the polymercaptan sealant. Metallic soaps in combination with calcium peroxide are useful for promoting tack-free surfaces and for curing polymercaptan sealants with quick formation of a protective skin on the polymercaptan sealant.

STORAGE STABLE ONE-PART POLYMERCAPTAN COMPOSITIONS

BACKGROUND OF THE INVENTION

1. Field of the Invention

This invention relates to stabilized resinous compositions useful as coating and sealing compositions capable of rapidly curing when exposed to the atmosphere and, more particularly, to a novel one-package coating and sealing composition of polymercaptans that will remain stable in storage for an indefinite period of time and yet will be readily curable after application to the surfaces to be treated to form an elastomer having good physical and chemical properties.

2. Description of the Prior Art

It is known that certain compositions based on polymercaptan resins, especially those resins which are most useful in preparing sealants and caulking compositions, can be used with advantage for a wide variety of coating and sealing applications. However, the polymercaptan resins used prior to this time have had the disadvantage of needing relatively long periods of time to promote tack-free surfaces and even longer periods of time to subsequently cure the sealant completely. In addition, the sealant and caulking compositions of the prior art require atmospheric moisture in addition to the presence of air (oxygen) in order to achieve a proper cure. These features have been persistant drawbacks in the commercial utilization of these compositions, restricting their effectiveness and desirability as sealants and caulking compositions. In particular, in regions where low humidity is prevalent, curing problems have been encountered for these compositions.

The foregoing drawbacks in polymercaptan compositions as sealants and caulking compositions has led to a search for additives which could promote rapid tack-free surfaces and short times for curing of the total compositions. In the past, it was felt that various additives as curing agents would have to be mixed with the particular polymer just prior to use in order to avoid premature solidification of the composition. Hence, it has been customary to supply the sealant composition in two packages, (i.e. two parts) one of which contains the fluid polymeric composition and the other of which contains the curing agent. The requirement that the sealant composition be incorporated in two packages imposes a serious limitation on its utility, particularly in cases where the product is sold in small quantities at the retail level. For retail distribution, a two-package product is undesirable both because of customer sales resistance and also because unskilled users may fail to follow the mixing instructions accurately and thereby achieve an unsatisfactory coating or seal.

The problem of producing a one-package (i.e. one-part) sealant that will remain stable in storage for an indefinite period of time and will also cure acceptably after it has been applied to the surfaces to be sealed has proved to be a difficult one to solve. One previously proposed single package, polysulfide-base sealant composition is disclosed in Smith U.S. Pat. No. 2,940,958. In accordance with the disclosure of the Smith Patent, the polymer is mixed with a water activable curing agent and a hydrated salt, thus being a two-component curing system. So long as the composition is kept at low temperature, it remains stable. When the composition is heated, the water of hydration of the hydrated salt is released and activates the curing agent to cause the composition to cure to an elastomeric form.

Another curing agent of two components for a polysulfide-base composition is disclosed in Jorczak et al. U.S. Pat. No. 3,247,138. This patent has the polymer mixed with two principal components, namely, a metallic soap and a chelating agent. This system has the disadvantage of needing a costly chelating agent for stabilizing the compositions against the premature curing that would occur if the metallic soap is used alone. Further, this system needs both the presence of oxygen and moisture in order to achieve a quick cure, so that use of these compositions is limited to regions where moisture is readily prevalent in the atmosphere.

SUMMARY OF THE INVENTION

Even though the prior art of rapidly curing polymeric compositions stresses the need for two-component curing systems, it has been surprisingly found that the polymercaptan compositions described hereinafter can have rapid tack-free surfaces followed by quick cures throughout the compositions through use of a single component additive of a metallic soap or a two-component additive of a metallic soap and calcium peroxide.

It is, accordingly, an object of the present invention to produce a one-package polymercaptan coating and sealing composition which remains stable when stored at atmospheric temperatures for very long periods of greater than 6 months, and which, when used for coating or sealing applications after an extended storage period, readily cures to provide a rubbery seal or coating having good physical and chemical properties.

A further object of this invention is to provide a polymercaptan sealant composition having a single additive curing agent which remains inactive when the composition is in a sealed container, but is activated on exposure to atmospheric oxygen, with or without moisture, to produce a cure of the polymercaptan polymer.

An additional object of this invention is to provide a polymercaptan sealant composition having a curing agent admixed therewith which, in the absence of free oxygen, remains inactive at normal environmental temperatures.

It is still another object of this invention to provide a polymercaptan sealant composition that can be compounded to permit selection of curing rates to achieve acceptable cures over curing periods which could vary from a few days to several months, as desired.

It is still another object of this invention to provide a polymercaptan sealant composition that can be compounded to permit selection of surface curing rates (formation of protective surface layer) to achieve acceptable forming times which could be varied from a few minutes to several hours, as the ultimate use may dictate.

It is still another object of this invention to provide a polymercaptan sealant composition which, when exposed to the atmosphere, rapidly develops an essentially tack-free film over its exposed surfaces with a relatively uniform rate of cure of the liquid core material.

Other objects and advantages of this invention will be, in part, obvious from a reading of the following specification and appended claims.

DESCRIPTION OF PREFERRED EMBODIMENTS

The objects and advantages of the present invention may be achieved in general by mixing a liquid polymercaptan resin having a number average molecular weight of about 800–10,000 and an SH functionality greater than two, and a single component additive curing catalyst of a metallic soap or a mixture of metallic soaps which remains inactive toward the polymer in the absence of free oxygen, but which upon exposure of the composition to free oxygen is activated to cure the polymer. Thus, as long as the present compositions are packaged in an airtight container substantially free from atmospheric oxygen, they remain stable for very long periods of time of greater than 6 months. When the container is opened and the composition is applied to a surface to be sealed or coated under such conditions that it is exposed to atmospheric air, curing of the polymer in the composition is initiated at a rate that depends in large part upon the amount of catalyst present. By varying the specific nature of the particular additive catalyst component and the amount of catalyst used, the period of cure can be varied over a relatively wide range of time from a few days to several months.

A further ramification of the present invention involves mixing a liquid polymercaptan resin having a number average molecular weight of about 800–10,000 and an SH functionality greater than two, and a two component additive curing catalyst of metallic soaps or mixtures thereof and calcium peroxide which remain inactive toward the polymer in the absence of free oxygen, but which upon exposure of the composition to free oxygen is activated to cure the polymer. Thus, as long as the present compositions are not exposed to oxygen, they remain stable for very long periods of time of greater than 6 months. When exposed to atmospheric oxygen, curing of the polymer in the composition is initiated at even greater rates than for the metallic soap components alone with the rate of cure depending, in large part, upon the amount of catalyst and the relative proportions of the catalyst components present. By varying the specific nature of the particular metallic soap additive component, and the total amount and relative proportions of catalytic components used, the period of cure can be varied over a relatively wide range of time from a few days to several months.

The polymercaptan resin component of the composition must have an SH functionality of at least two, that is, it must have an average of two —SH groups per resin molecule. Additionally, the resin must be virtually free from molecules bearing only one —SH group, so that the molecules of the polymercaptan resin component must contain two or more, e.g., up to 10 —SH groups per molecule. Compositions containing resin molecules which have only one —SH group per molecule are generally fluid after curing and can be subject to cold flow after application. Advantageously for preparing cured products of enhanced resistance to cold flow, which also have desirable tensile strength for use in sealing and caulking compositions, a resin is used which has an SH functionality between about 2.1–9. Additionally, the polymercaptan resin component should have a number average molecular weight between about 800–10,000. Resins have an SH functionality greater than two, but which have molecular weight below about 800, form products of retarded elasticity which can be undesirable in sealants, while resins having molecular weight above about 10,000 can be highly viscous and can be difficult to formulate with fillers, pigments, and the like.

Exemplary resins for the polymercaptan component are those resins prepared from polyepoxides having an epoxy equivalency greater than two, i.e., the number of epoxy groups contained in the average polyepoxide molecule is greater than two. Such polyepoxides can be employed in preparing the polymercaptan resin by reaction with hydrogen sulfide, or by first converting epoxy groups to halohydrin groups and thereafter reacting the halohydrin groups with a metallic sulfhydrate such as sodium sulfhydrate or potassium sulfhydrate.

Examples of the polyepoxides which can be used in forming the polymercaptan resin include the polyepoxy-containing polymeric reaction product of a halogen-containing epoxide with an aliphatic polyhydric alcohol, e.g., glycerol, pentaerythritol, 1,2,6-hexanetriol, or 1,3,5-pentanetriol wherein a portion of the halogen-containing epoxide can be formed from an aromatic polyhydric phenol such as resorcinol, catechol, or bis-phenol, and a halogen-containing epoxide such as an epihalohydrin or 3-chloro-1,2-epoxybutane. Further exemplary polyepoxides are those obtained by reacting a polyhydric phenol with a polyepoxide compound such as bis (2,3-epoxypropyl) ether, or bis(2,3-epoxy-2-methylpropyl) ether, or those obtained as the reaction product of such a polyepoxide compound with an aliphatic polyhydric alcohol.

Another serviceable group of polyepoxides includes esters of epoxy acids and polyhydric alcohols, or phenols, containing three or more hydroxyl groups, for example, esters of 2,3-epoxypropionic acid reacted with glycerol (or with 1,2,6-hexanetriol) and esters of 3,4-epoxybutanoic acid and polyvinyl alcohol. Other suitable polyepoxides are those esters of epoxy alcohols and polycarboxylic acids containing three or more carboxylic groups, e.g., triglycidyl ester of 1,2,4-butanetricarboxylic acid, triglycidyl esters of 1,3,6-hexanetricarboxylic acid, and glycidyl ester of pyromellitic acid.

Polymercaptan resins which generally are present in mixture with polymercaptans formed from the above-described polyepoxide precursors and which, for economy and efficiency, advantageously form only about 20 weight percent or less of the total polymercaptan resin component include resins prepared from the reaction of hydrogen sulfide with polythiuranes. Other such polymercaptan resins which generally are mixed with the polymercaptans derived from the above-described polyepoxide precursors include the epoxidized polymers and copolymers of compounds such as isoprene and butadiene which have been reacted with hydrogen sulfide, as well as mercaptoethyl esters of polyacrylic acid and mercaptobutyl esters of copolymers prepared from methacrylic acid and styrene.

The especially preferred polymercaptan resins for economy are those prepared by initially reacting a polyhydric alcohol such as 1,2,6-hexanetriol, glycerol, trimethylol propane, or pentaerythritol with an alkylene oxide, for example, propylene oxide or ethylene oxide, there usually being a substantial molar excess of alkylene oxide present during reaction, and thereafter reacting the resulting polyoxyalkylene-modified polyhydric alcohol with a halogen containing epoxide, e.g., an epihalohydrin or 3-chloro-1,2-epoxy-butane, to prepare a halogenated polyhydric polyether, that is to prepare a polyether having halohydrin groups and finally preparing the corresponding mercaptan polymer by reaction with a metallic sulfhydrate. Such especially preferred resins include those which have been shown in Belgium Pat. No. 636,248. These especially preferred resins usually have a number average molecular weight within the range from about 1,000 to about 7,000 and SH functionality between about 2.1 and about 6.

In general, the present compositions can be used for all the purposes for which the prior two-package polymercaptan compositions or polysulfide compositions have been used, e.g., caulking, sealing, potting, coating, impregnation of porous materials, and the like. Like the prior two-package polysulfide compositions and polymercaptan compositions, they produce cured materials that adhere tenaciously to clean surfaces of wood, glass, metal, building materials, plastics, leather, fabrics, and other porous substances. They also exhibit the well-known physical and chemical properties of cured polymercaptan polymers such as elasticity, tensile strength, and low permeability to gases, as well as resistance to degradation from sunlight, atmospheric oxidation, and acids.

As noted previously, the curing catalyst of the present invention comprises a principal component of a metallic soap. The metallic soap has a very remarkable advantage of being in liquid form, in normal practice, so that it is much more easily incorporated into a polymercaptan resin with minimal blending effort and with solid additives, such as barium oxide, and other solid components such as the antioxidants mentioned in U.S. Pat. application Ser. No. 561,715 now U.S. Pat. No. 3,413,261. In the presence of such antioxidants, the remarkable utility of the curing components of the present invention are even further enhanced. The metallic soap can be employed in solution in an inert organic solvent to further facilitate dispersion in the polymeric composition. Metal soaps useful in the present compositions comprise those that have previously been employed as driers in paint mixtures and include the naphthenates, octoates, decanates, neodecanates, and tallates of cobalt, lead, copper, zinc, sodium, manganese, and iron and mixtures of such metallic soaps. Any of various commercially available solvent solutions of these soaps, which commonly contain from 5 percent to 25 percent by weight of metal, may be used satisfactorily. The amount of metallic soap used in the present composition varies as a function of the curing rate desired. Usually, the quantity of soap is such as to provide from 0.001 to 5.0 parts per hundred parts of resin.

In addition to the polymer and the catalytic additives, the present compositions may contain a variety of special purpose ingredients, all of which are known in the prior art. Thus, the compositions may be compounded to include ingredients such as pigments, fillers, brighteners, plasticizers, diluents, dyes, retarders, accelerators, reinforcing agents, tackifiers, and the like. In addition, other resinous substances in addition to polymercaptan resins may be employed and formulated into sealing and caulking compositions using the teaching of the present invention.

Since the curing catalysts used in the present compositions are activated by oxygen, it is important that compounding of the present compositions be carried out in an oxygen-free atmosphere, and that the compositions be maintained in such an atmosphere until they are used. A typical and illustrative procedure for preparing the compositions described in the examples given below is as follows: Mixing is effected in a sigma mixer having a 0.3 gallon capacity and equipped with connections to suitable vacuum and pressurizing sources (or with a suitable source of inert gas for purging over the composition during mixing). The polymer is placed in the mixer and a blend of the compounding ingredients, other than the curing catalyst, are added thereto. Mixing of the liquid polymer and subordinate compounding ingredients is continued for about 15 minutes, after which the mixer is placed under a 15- to 20-inch vacuum (or inert gas). The curing catalyst, selected from a metallic soap solution, mixtures of metallic soap solutions, or metallic soap solutions with calcium peroxide, is then added to the mixer. Mixing is continued for about 2 hours under vacuum to remove oxygen occluded in the polymer and the compounding ingredients, as well as from the atmosphere within the mixer above the mix. During this 2-hour period, the solvent, associated with the curing catalyst, evaporates. At the end of the 2-hour period of mixing, nitrogen or inert gas is introduced into the mixer to fill the free space above the mixture to a pressure 5 to 10 p.s.i. gauge. Mixing of the batch is terminated about one-half hour after the introduction of the inert gas into the mixer.

Compositions, as thus prepared, can be packaged in collapsible metal tubes or rigid containers, as desired. When proper precautions are taken to exclude oxygen from the container, these compositions are characterized by outstanding, long term stability. Storage temperatures may vary from −20° to +160° F. without activating any noticeable cure. Also, specimens have been stored in metallic tubes at 75°±20° F. for more than 1 year. In cases where the compositions are packaged in collapsible tubes, metallic tubes are preferred over plastic tubes because the former are more nearly impervious to moisture and atmospheric oxygen. Such collapsible tubes provide a convenient method of applying the composition to cracks or crevices that are to be sealed therewith.

As indicated above, curing of the present compositions, after their application to substrate surfaces, is activated by atmospheric air (oxygen). The curing process is characterized by relatively rapid development of an essentially tack-free film or skin, which toughens with age, and by a relatively uniform polymerization of the liquid material beneath the skin. The time required to develop this external skin is generally proportional to the period of time required for complete cure. The skins develop almost instantly, with the greatest amount of time needed to form a skin being of the order of several hours. The external skin, developed by the present compositions, provides a degree of protection to the underlying fluid polymeric material. If the skin is accidentally ruptured, a new skin forms rapidly, that is, the skin is "self-healing." Also, the skin has a constant color once the tack-free film has formed on the fluid polymercaptan materials.

The curing period may be selected from within a range of days to several months and depends upon such factors as the choice of the metallic component of the metallic soap used to prepare the catalytic additive; the quantity and composition of the catalytic additive, the kind of curing environment; e.g., the ambient temperature during cure, and the ratio of exposed area of the seal to the mass of composition used therein. Factors which tend to increase the curing rate are: the use of a relatively high percentage of metallic soap in relation to the quantity of polymer, the employment of higher ambient temperatures up to about 220° F., and the use of a high ratio of exposed area to mass, e.g., the application of composition in a relatively thin layer or coating. Films of one sixty-fourth to one thirty-second inch thick can be formulated to cure within at least 24 hours.

In greater detail, metallic soaps are a group of water-insoluble compounds containing alkaline earth or heavy metals combined with monobasic carboxylic acids of six to 22 carbon atoms. The metallic soaps can be represented by the general formula $(RCOO)_xM$, where R is an aliphatic or alicyclic radical and M is a metal with valence X. Their water insolubility differentiates them from ordinary soap, and their solubility or solvation in organic solvents accounts for their manifold uses. As normally encountered, these materials are a special group of metallic soaps used to hasten the drying of paint and varnish oils. The acid portion of the metallic soaps consists of naturally occurring long-chain monocarboxylic saturated and unsaturated fatty acids with six to twenty-two or more carbon atoms, rosin acids, tall oil, naphthenic acids, 2-ethylhexoic acid, and the newer synthetic tertiary acids (alkylacetic acids-ethanoic acids). Salts of acids with fewer than six carbon atoms form soaps which are water soluble. Salts of the dicarboxylic organic acids produce products of low solubility and are not considered metallic soaps. It has long been established that the metal or cation of the metallic soap is the active principle which accelerates the oxidation and polymerization reactions associated with the drying of oils. As many as 24 metals are known to have activity, but the soaps of cobalt, manganese, lead, iron, calcium, zinc, and zirconium account for the major share of present-day use. Of these cobalt, manganese, lead, and iron soaps are the primary driers.

In addition, it has been found that certain selected metallic soaps, in particular, cobalt, potassium, copper, sodium, manganese, and iron metallic soaps, promote more rapid tack-free conditions, in combination with calcium peroxide, without discoloration of the polymercaptan sealant as do the same metallic soaps when used alone.

A particularly enhanced utility of this invention has been employing mixtures of metallic soaps, with or without calcium peroxide, whereby a metallic soap which primarily acts as a surface curing component (such as iron, cobalt, and manganese soaps) is combined with a metallic soap which primarily acts as a through curing component (i.e., cures throughout the composition as opposed to forming a skin, such as lead and zinc soaps). These curing additives, so mixed, accelerate the formation of protective surface layers of cured polymer, as noted above, plus promote very rapid total cure of the liquid polymer beneath the protective surface layers.

The following examples show ways in which the invention has been practiced, but should not be construed as limiting the invention. Unless otherwise specified, the parts disclosed in the examples are parts by weight, and the temperatures are in degrees Centigrade.

The polymercaptan resin employed in these examples is a water-white liquid having a molecular weight of about 6,000 and a SH functionality of 2.3, as measured by iodimetric titration. The resin is prepared from a propylene oxide derivative of trimethylol propane, which derivative is then reacted with epichlorohydrin and then, subsequently, with sodium sulfhydrate, to prepare the polymercaptan resin. This resin is divided into 100 part portions for mixture with various metallic driers and a control sample with no drier. The polymercaptan resin has the following structure

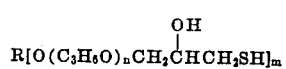

where R is an aliphatic hydrocarbon, $n$ is an integer varying between 1 and 2, and $m$ varies between 2 and 3.

Each portion is then formulated with additives so that the following is a typical range of the sealant formulation as practiced in this invention.

| Component | Parts by Weight |
|---|---|
| Polymercaptan Resin | 100 |
| Bulk and Reinforcing Fillers | 25–100 |
| Titanium Dioxide (TiO$_2$) | 0–15 |
| Extender (Plasticizing Agent) | 0–50 |

|  |  |
|---|---|
| Adhesion Promoter | 0-10 |
| Thixotropic Agent | 0-10 |
| Metallic Soap Drier | 0-5.0 |

The absence of metallic drier was practiced as a control for comparative purposes in evaluating metallic soaps as rapid skin forming and curing agents.

In order that those skilled in the art may more completely understand the present invention and the preferred methods by which the same may be carried into effect, the following specific examples may be offered.

EXAMPLE 1

According to the foregoing practice, sixteen 100 part portions of polymercaptan resin were prepared and formulated as follows:

| Component | Parts by Weight |
|---|---|
| Polymercaptan Resin | 100 |
| Adhesion Promoter (Gamma Mercaptopropyltrimethoxy Silane) | 1 |
| Titanium Dioxide (TiO$_2$) | 15 |
| Thixotropic Agent (Hydrogenated Castor Oil—Thixcin R) | 4 |
| Filler (Calcium Caronate— Super Multiflex) | 75 |
| Moisture Scavenger (Crystalline Alumino-silicates— Molecular Sieve 4A) | 1 |
| Chemical Drier (as identified below) | 1 |

All the ingredients, up to the metallic drier, are placed in a Cowles Blender and thoroughly mixed at 140° F. ±20° F. The resulting mixture is run twice through mating rolls. After this, the material is placed in an air tight box with an inert gas atmosphere of nitrogen. Following this, while maintaining the nitrogen atmosphere, the metallic drier is added to the composition, which is easily mixed into the composition as the metallic soap is a liquid. The following table is an identification of: (1) the chemical drier by composition with the trade designation in brackets, (2) the color, and (3) the cure rate in inches of a wet film of the composition which is one-fourth inch in total thickness and surface condition relative to the degree of tackiness at intervals of 8 days, 27 days, 43 days, 63 days, and 91 days.

exposure to the atmosphere. The foregoing table shows excellent skin forming characteristics and curing properties being achieved by the iron and cobalt metallic soap solutions with very rapid formation of surface skin of the polymercaptan resin. These driers have the development of rapid tack-free conditions with no adverse affects on the other properties (stability, hardness, water absorption, tensile strength and elongation, heat resistance, peel strength, etc.) of the composition.

EXAMPLE 2

According to the practice of example 1, sixteen 100 part portions of polymercaptan resin were prepared and formulated as follows:

| Component | Parts by Weight |
|---|---|
| Polymercaptan Resin | 100 |
| Adhesion Promoter (Gamma-Mercaptopropyltrimethoxy Silane) | 1 |
| Titanium Dioxide (TiO$_2$) | 15 |
| Thixotropic Agent (Hydrogenated Castor Oil—Thixcin R) | 4 |
| Filler (Calcium Carbonate— Super Multiflex) | 75 |
| Moisture Scavenger Crystalline Alumino-Silicates— Molecular Sieve 4A) | 1 |
| Dioctyl Phthalate— (Plasticizing Agent) | 7 |
| Calcium Peroxide | 5 |
| Chemical Drier (As identified below) | 1 |

All the ingredients up to the calcium peroxide are placed in a Cowles Blender and thoroughly mixed at 140° F. ±20° F. The resulting mixture is run twice through mating rolls. After this, the material is placed in an airtight box with an inert gas atmosphere of nitrogen. Following this, the metallic drier and the calcium peroxide are added to the composition. This blending is greatly facilitated by the fact that the driers of metallic soap are in liquid form. The following table is an identification of (1) the chemical drier by composition with the trade designation in brackets, (2) the color of the composition and (3) the cure rate in inches of a wet film of the composition which is one-fourth inch in total thickness, and

TABLE 1

| Sample No. | Chemical drier | Sealant color | Cure rate (inches) and surface condition at 73° F. at | | | | |
|---|---|---|---|---|---|---|---|
| | | | 8 days | 27 days | 43 days | 63 days | 91 days |
| 1 | None | White | NS | NS | NS | NS | NS |
| 2 | 18% zinc 2-ethylhexanate solution (zinc Hex-Cem)[1] | do | NS | NS | NS | NS | NS |
| 3 | 5% calcium 2-ethylhexanate solution (calcium Hex-Cem)[1] | do | NS | NS | NS | NS | NS |
| 4 | 12% cobalt 2-ethylhexanate solution (cobalt Hex-Cem)[1] | Light Purple | 1/32 VT | 3/32 MT | 9/32 MT | 3/16 NT VT | Cured |
| 5 | 10% nickel 2-ethylhexanate solution (nickel Hex-Cem)[1] | White | NS | <1/64 | <1/64 | <1/64 | 7/32 VT |
| 6 | 6% copper neo-decanate solution (copper Ten-Cem)[1] | do | NS | NS | NS | <1/64 VT | 1/16 VT |
| 7 | 12% cobalt neo-decanate solution (cobalt Ten-Cem)[1] | Light purple | 1/64 VT | 1/16 VT | 5/32 T | 1/8 ST | Cured |
| 8 | 6% manganese neo-decanate solution (manganese Ten-Cem)[1] | White | NS | NS | NS | NS | NS |
| 9 | 24% lead neo-decanate solution (lead Ten-Cem)[1] | do | NS | NS | NS | NS | NS |
| 10 | 3% magnesium neo-decanate solution (magnesium Ten-Cem)[1] | do | NS | NS | NS | NS | NS |
| 11 | 10% zinc neo-decanate solution (zinc Ten-Cem)[1] | do | NS | NS | NS | NS | NS |
| 12 | 6% iron neo-decanate solution (iron Ten-Cem)[1] | do | 2 1/32 | 1/8 NT | 11/64 NT | 3/16 NT | Cured |
| 13 | 5% calcium neo-decanate solution (calcium Ten-Cem)[1] | do | NS | NS | NS | NS | NS |
| 14 | 8% potassium neo-decanate solution (potassium Ten-Cem)[1] | do | NS | NS | NS | NS | NS |
| 15 | 5% sodium neo-decanate solution (sodium Ten-Cem)[1] | do | NS | NS | NS | NS | NS |
| 16 | 3% vanadium naphthenate solution (vanadium Nap-All)[1] | do | NS | NS | NS | NS | NS |

[1] = Tradename of the Mooney Chemical Company.
[2] Tack-free within 90 minutes.

NOTE.—NS=No skin; NT=No tack; ST=Slight tack; MT=Medium tack; VT=Very tacky.

A desirable skin-forming agent preferably should exhibit at least one sixty-fourth inch of skin formation with eight days of surface condition relative to the degree of tackiness at intervals of 3 days, 22 days, 39 days and 58 days.

TABLE 2

| Sample No. | Chemical drier | Sealant color | Cure rate (inches) and surface condition at 73° F. at following days | | | |
|---|---|---|---|---|---|---|
| | | | 3 days | 22 days | 39 days | 58 days |
| 17 | None | White | 1/64 VT | 1/8 VT | 5/32 ST | Cured |
| 18 | 18% zinc 2-ethylhexanate solution (zinc Hex-Cem)[1] | do | NS | 5/32 VT | 7/32 MT | Do. |

TABLE 2—Continued

| Sample No. | Chemical drier | Sealant color | Cure rate (inches) and surface condition at 73° F. at following days | | | |
|---|---|---|---|---|---|---|
| | | | 3 days | 22 days | 39 days | 58 days |
| 19 | 5% calcium 2-ethylhexanate solution (calcium Hex-Cem) [1] | do | 1/32 VT | 1/8 MT | 6/32 NT | Do. |
| 20 | 12% cobalt 2-ethylhexanate solution (cobalt Hex-Cem) [1] | Purple | 1/16 ST | 1/8 ST | Cured | Do. |
| 21 | 10% nickel 2-ethylhexanate solution (nickel Hex-Cem) [1] | Tan | 1/32 MT | 9/64 VT | 5/32 MT | Do. |
| 22 | 6% copper neo-decanate solution (copper Ten-Cem) [1] | White | 1/32 ST | 1/8 NT | Cured | Do. |
| 23 | 12% cobalt neo-decanate solution (cobalt Ten-Cem) [1] | Purple | 1/32 ST | 9/64 NT | Cured | Do. |
| 24 | 6% manganese neo-decanate solution (manganese Ten-Cem) [1] | White | A 1/32 ST | 9/64 NT | 5/32 NT | Do. |
| 25 | 24% lead neo-decanate solution (lead Ten-Cem) [1] | Offwhite | <5/64 VT | 5/32 VT | Cured | Do. |
| 26 | 3% magnesium neo-decanate solution (magnesium Ten-Cem) [1] | White | 1/64 VT | 1/8 MT | 9/32 ST | Do. |
| 27 | 16% zinc neo-decanate solution (zinc Ten-Cem) [1] | do | NS | 5/32 VT | Cured | Do. |
| 28 | 6% iron neo-decanate solution (iron Ten-Cem) [1] | do | B 1/32 NT | 1/8 NT | 5/32 NT | Do. |
| 29 | 5% calcium neo-decanate solution (calcium Ten-Cem) [1] | do | 1/64 MT | 1/8 ST | 5/32 ST | Do. |
| 30 | 8% potassium neo-decanate solution (potassium Ten-Cem) [1] | do | 1/32 ST | 1/8 ST | 11/64 NT | Do. |
| 31 | 5% sodium neo-decanate solution (sodium Ten-Cem) [1] | do | 1/32 ST | 1/8 ST | Cured | Do. |
| 32 | 3% vanadium naphthenate solution (vanadium Nap-All) [1] | do | NS | 1/8 MT | 5/32 MT | Do. |

NOTE.—NS=No skin; NT=No tack; ST=Slight tack; MT=Medium tack; VT=Very tacky.
[1]=Trade designation of the Mooney Chemical Company.
A=Medium tack after 105 minutes.
B=Tack free in 75 minutes.

In the presence of calcium peroxide, a desirable skin-forming agent preferably should exhibit at least one thirty-second inch of skin formation within 3 days of exposure to the atmosphere. Further, the degree of tackiness should be reduced to the level of slight tackiness (ST) within 3 days time after exposure to air. The foregoing table shows excellent curing properties and reduction of tackiness being achieved by the combination of calcium peroxide and a metallic soap wherein the metallic ion is cobalt, sodium, copper, manganese, potassium and iron. These combinations had pronounced measurable improvement in formation of surface skin of the polymercaptan resin. These driers have the development of rapid tack-free conditions with no adverse affects on other properties (stability, hardness, water absorption, tensile strength, elongation, heat resistance, peel strength). The table further shows no loss of curing properties for a combination of calcium peroxide and a metallic soap wherein the metallic ion is iron or manganese with very striking film forming properties (i.e., formation of a surface film which left the surface greatly reduced in tackiness).

EXAMPLE 3

This example uses a variety of chemical driers with a calcium peroxide component with the chemical drier varying in the organic chain. The particular formation being used is:

| Component | Parts by Weight |
|---|---|
| Polymercaptan Resin (As in Example 1) | 100 |
| Adhesion Promoter (Gamma-Mercaptopropyltrimethoxy Silane) | 1.5 |
| Dioctyl Phthalate | 50 |
| Thixotropic Agent (Hydrogenated Castor Oil—Thixcin R) | 12 |
| Titanium Dioxide | 25 |
| Filler (Calcium Carbonate) | 100 |
| Moisture Scavenger (Crystalline Alumino-Silicates—Molecular Sieve 4A) | 5 |
| Calcium Peroxide | 15 |
| Barium Oxide | 2 |
| Chemical Drier (As indicated below) | 0.4 |

All ingredients are blended as per example 1, and the following table is a measure of the rapidity of skin formation on a film of the composition which is initially one-fourth inch thick.

TABLE 3

| Sample | Chemical drier | Surface condition [1] | Color of sample |
|---|---|---|---|
| 33 | 12% cobalt naphthenate solution | Tack free | Brown. |
| 34 | 6% manganese naphthenate solution | Slight tack | Off-white. |
| 35 | 12% cobalt neodecanate solution | Tack free | Grey. |
| 36 | 12% cobalt naphthenate solution | do | Brown. |
| 37 | 6% cobalt naphthenate solution | Slight tack | Grey. |
| 38 | No drier | Tacky | White. |

[1] After 45 minutes at 75° F.

This example shows that various chemical chains can be used with the specified metallic ions and achieve the tack-free surface with quick skin forming ability. Further, the curing time was improved or equal to that for the same concentration of calcium peroxide without a metallic drier.

EXAMPLE 4

This example illustrates how effective the chemical driers of this invention are despite variations in relative humidity. The particular formulation being employed is:

| Component | Parts by weight |
|---|---|
| Polymercaptan Resin (As in Example 1) | 100 |
| Plasticizer (Aroclor 1254—Polychlorinated Polyphenyls) | 30 |
| Adhesion Promoter (Gamma-Mercaptopropyltrimethoxy Silane) | 1 |
| Thixotropic Agent (Hydrogenated Castor Oil—Thixcin R) | 5.2 |
| Titanium Dioxide | 10 |
| Filler (Calcium Carbonate—Multiflex MM) | 50 |
| 6% Iron Neo-Decanate Solution (Metallic Drier) | 0.5 |

All ingredients up to the metallic drier are placed in a Cowles Blender and thoroughly mixed at 140° F. ±20° F. as set forth in example 2. The composition is divided into two portions, one of which is exposed to a 10 percent relative humidity and the other is exposed to a 50 percent relative humidity. The following table is an identification of the cure rate in inches of a wet film of each composition which is one-fourth inch thick and surface condition of the film, with the time being measured by days of exposure to the particular atmosphere.

TABLE 4

| Days | Cure rate from top surface at 75° C. in inches | |
|---|---|---|
| | 10% RH | 50% RH |
| 1 | 1/64 HT | 1/64 HT |
| 4 | 1/32 HT | 3/64 HT |
| 14 | 1/16 NT | 1/16 HT |

| | | |
|---|---|---|
| 28 | 3/32 NT | 7/64 MT |
| 42 | 7/64 NT | 1/8 ST |
| 56 | 1/8 NT | 5/32 ST |
| 70 | 11/64 NT | 11/64 NT |
| 84 | 1/4 NT | 1/4 NT |

HT = Heavy Tack
MT = Medium Tack
ST = Slight Tack
NT = No Tack

This table shows comparable skin-forming ability of the composition at low humidity levels as well as higher humidity levels. Comparable results were obtained for all polymercaptan resin formulations having the various metallic soap driers employed in the foregoing examples, with or without additions of calcium peroxide.

EXAMPLE 5

This example illustrates that a mixture of a through drier or auxiliary drier of a metallic soap and a surface drier of a metallic soap accelerate the skin forming properties and promote rapid cure throughout the composition. The particular formulation being employed is as set forth in example 4, except formulation A has 0.5 parts, by weight, of 6 percent iron neodecanate solution (surface drier) and 0.5 parts, by weight, of 24 percent lead neodecanate solution (through drier); formulation B has 0.5 parts, by weight, of 6 percent iron neodecanate solution (surface drier) and 0.5 parts, by weight, of 16 percent zinc neodecanate solution (auxiliary through drier); and formulation C has 0.5 parts, by weight, of 6 percent iron neodecanate solution (surface drier) and 0.5 parts, by weight, of 5 percent calcium neodecanate solution (auxiliary drier). Mixing is as set forth for example 4. Each formulation is divided into two portions, one of which is exposed to a 10 percent relative humidity and the other is exposed to a 50 percent relative humidity. The following table is an identification of the cure rate in inches of a wet film of each composition which is one-fourth inch thick along with the surface condition of the film with the time being measured by days of exposure to the particular atmosphere.

TABLE 5

| Days | Formulation A | | Formulation B | | Formulation C | |
|---|---|---|---|---|---|---|
| | 10% RH | 50% RH | 10% RH | 50% RH | 10% RH | 50% RH |
| 1 | 1/64 HT | 1/64 HT | 1/64 HT | 1/64 HT | 1/64 HT | 1/64 HT |
| 4 | 1/32 HT | 3/64 HT | 1/32 HT | 3/64 HT | 1/32 HT | 3/64 HT |
| 14 | 1/16 ST | 3/16 HT | 1/16 MT | 3/64 HT | 1/16 ST | 1/16 HT |
| 28 | 3/32 ST | 7/64 HT | 3/32 ST | 7/64 MT | 3/32 NT | 3/32 MT |
| 42 | 7/64 ST | 1/8 ST | 1/8 ST | 9/64 MT | 7/64 NT | 1/8 ST |
| 56 | 1/8 ST | 3/32 ST | 9/64 ST | 9/32 MT | 1/8 NT | 5/32 ST |
| 70 | 9/64 NT | 11/64 ST | 3/32 NT | 3/16 ST | 9/64 NT | 3/16 NT |
| 84 | 9/32 NT | 1/4 NT | 9/32 NT | 1/4 NT | 9/32 NT | 1/4 NT |
| 98 | 3/16 NT | | | | 3/16 NT | |
| 112 | 1/4 NT | | 1/4 NT | | 1/4 NT | |
| Hardness, Shore A | 32 | 26 | 33 | 28 | 33 | 25 |

Note.—RH = Relative humidity.

This table shows that the addition of a "through" or "auxiliary" drier such as lead or zinc metallic soaps tend to improve the cure rate and produces a more complete cure of the compositions resulting in slight by higher hardness values of the compositions (normal hardness would be approximately 22).

It is to be understood that, although the invention has been described with specific reference to particular embodiments thereof, it is not to be so limited, since changes and alterations therein may be made which are within the full intended scope of this invention as defined by the appended claims.

What is claimed is:

1. A storage stable article adapted for stability beyond 6 months and for rapid cure plus development of tack-free surfaces within a few days exposure to atmospheric air, said article being an airtight package containing a one-part polymercaptan resin coating and sealing composition comprising a liquid resinous mixture of a polymercaptan resin having a molecular weight of about 800–10,000 and an SH functionality of at least two, and wherein said polymercaptan resin is selected from the group consisting of:
   1. polymercaptans derived from polyepoxide precursors having epoxy equivalency greater than two and convertible to polymercaptan resin by reaction with hydrogen sulfide, or by first converting epoxide groups to halohydrin groups followed by reaction of said halohydrin groups with a metallic sulfhydrate;
   2. polymercaptans produced by reacting a polyhydric alcohol with an alkylene oxide to prepare a polyoxyalklene-modified polyhydric alcohol and subsequently reacting said alcohol with a halogen containing epoxide to prepare a polyether having halohydrin groups, and reacting said halohydrin groups with a metallic sulfhydrate; and,
   3. mercaptoethyl esters of polyacrylic acid and mercaptobutyl esters of copolymers prepared from methacrylic acid and styrene;

and a curing, skin-forming additive consisting essentially of a substance selected from the group consisting of:
   A. a metallic soap drier having a metallic ion selected from the group consisting of cobalt, iron, nickel, and combinations thereof;
   B. calcium peroxide in combination with a metallic soap drier having a metallic ion selected from the group consisting of cobalt, copper, potassium, sodium, iron, manganese and combinations thereof; and
   C. a metallic soap drier having a metallic ion selected from the group consisting of iron, cobalt, manganese and combinations thereof, in further combination with an auxiliary metallic soap drier having a metallic ion selected from the group consisting of lead, zinc, and combinations thereof; wherein the acid portion of said metallic soap drier is derived from monobasic carboxylic acids having six to twenty-two carbon atoms.

2. The article of claim 1 wherein said polymercaptan resin contains from about 0.1 to 5.0 parts of said metallic soap drier additive per 100 parts of polymercaptan resin.

3. The article of claim 1 wherein said group (C) metallic soap drier has iron as the metallic ion, and said drier is in combination with an auxiliary metallic soap drier having a metallic ion selected from the group consisting of lead, zinc, calcium, and combinations thereof.

* * * * *